(12) United States Patent
Kundu et al.

(10) Patent No.: US 12,726,517 B2
(45) Date of Patent: Sep. 1, 2026

(54) UNCHEATABLE FEDERATED LEARNING

(71) Applicant: Cisco Technology, Inc., San Jose, CA (US)

(72) Inventors: Ashish Kundu, San Jose, CA (US); Myungjin Lee, Bellevue, WA (US); Ramana Rao V. R. Kompella, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 245 days.

(21) Appl. No.: 17/541,508

(22) Filed: Dec. 3, 2021

(65) Prior Publication Data

US 2023/0179630 A1 Jun. 8, 2023

(51) Int. Cl.
*H04L 9/40* (2022.01)
*G06N 20/20* (2019.01)

(52) U.S. Cl.
CPC ......... *H04L 63/1491* (2013.01); *G06N 20/20* (2019.01)

(58) Field of Classification Search
CPC .... H04L 63/1491; G06N 20/20; G06N 3/045; G06N 3/08; G06N 3/084; G06N 20/00
USPC ........................................................ 706/23
See application file for complete search history.

(56) References Cited

U.S. PATENT DOCUMENTS 10,990,896 B2 4/2021 Jenson
11,100,506 B2 8/2021 Zoldi et al.
2019/0042937 A1* 2/2019 Sheller .................... G06N 3/08
2019/0080089 A1* 3/2019 Chen ...................... G06N 20/10
2020/0019699 A1* 1/2020 Araujo ................... G06N 3/045
2020/0134461 A1* 4/2020 Chai ...................... G06N 3/084
2020/0252802 A1 8/2020 Pachauri et al.
2020/0324407 A1* 10/2020 Rajkumar ............. B25J 9/0003
2021/0019657 A1 1/2021 Wu et al.
2021/0051169 A1* 2/2021 Karame ................. G06N 20/00
2021/0125732 A1* 4/2021 Patel ........................ G06N 5/01
2021/0194924 A1* 6/2021 Heinemeyer ......... G06F 21/577

FOREIGN PATENT DOCUMENTS

CN 112402982 A 2/2021

OTHER PUBLICATIONS

Li, et al.,"Learning to Detect Malicious Clients for Robust Federated Learning", online: https://arxiv.org/pdf/2002.00211.pdf, Feb. 1, 2020, 7 pages, arXiv.org.

(Continued)

*Primary Examiner* — Tan Doan
(74) *Attorney, Agent, or Firm* — Lee & Hayes, P.C.

(57) ABSTRACT

In one embodiment, a device identifies a plurality of nodes of a distributed or federated learning system. The device receives model training results from the plurality of nodes. The device determines, based in part on the model training results or information about the plurality of nodes, whether a particular node or subset of nodes in the plurality of nodes provided fraudulent model training results. The device initiates a corrective measure with respect to the particular node or subset of nodes, based on a determination that the particular node or subset of nodes provided fraudulent model training results, in accordance with a policy.

20 Claims, 7 Drawing Sheets

(56) References Cited

OTHER PUBLICATIONS

Tekgul, et al., "WAFFLE: Watermarking in Federated Learning", online: https://arxiv.org/pdf/2008.07298.pdf, Jul. 22, 2021, 14 pages, arXiv.org.

Gopani, Avi, "Distributed Machine Learning Vs Federated Learning: Which Is Better?", online: https://analyticsindiamag.com/distributed-machine-learning-vs-federated-learning-which-is-better/, Oct. 8, 2021, 1 page.

"Federated Learning", online: https://en.wikipedia.org/wiki/Federated_learning, Nov. 12, 2021, 8 pages, Wikimedia Foundation, Inc.

* cited by examiner

UNCHEATABLE FEDERATED LEARNING

TECHNICAL FIELD

The present disclosure relates generally to computer networks, and, more particularly, to uncheatable federated learning.

BACKGROUND

Machine learning is becoming increasingly ubiquitous in the field of computing. Indeed, machine learning is now used across a wide variety of use cases, from analyzing sensor data from sensor systems to performing future predictions for controlled systems.

As machine learning tasks, such as model training, become increasingly complex, it is now often the case in which a task is split across multiple nodes/devices. For instance, federated and distributed learning approaches have arisen to help combat the challenges associated with large datasets, data privacy concerns, and the like. Such systems can involve tens, if not hundreds, of different nodes/devices involved in the process.

It is generally assumed that each node in a federated or distributed learning system will provide legitimate results. However, any given node may still 'cheat' by providing fraudulent results, either maliciously or as a result of trying to avoid its full responsibilities. For instance, a node may cheat by conducting model training on partial data, by delegating its training to another system that cheats, etc. In these cases, the fraudulent data provided by that node to the system could result in the finalized model being polluted and impacting its performance.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
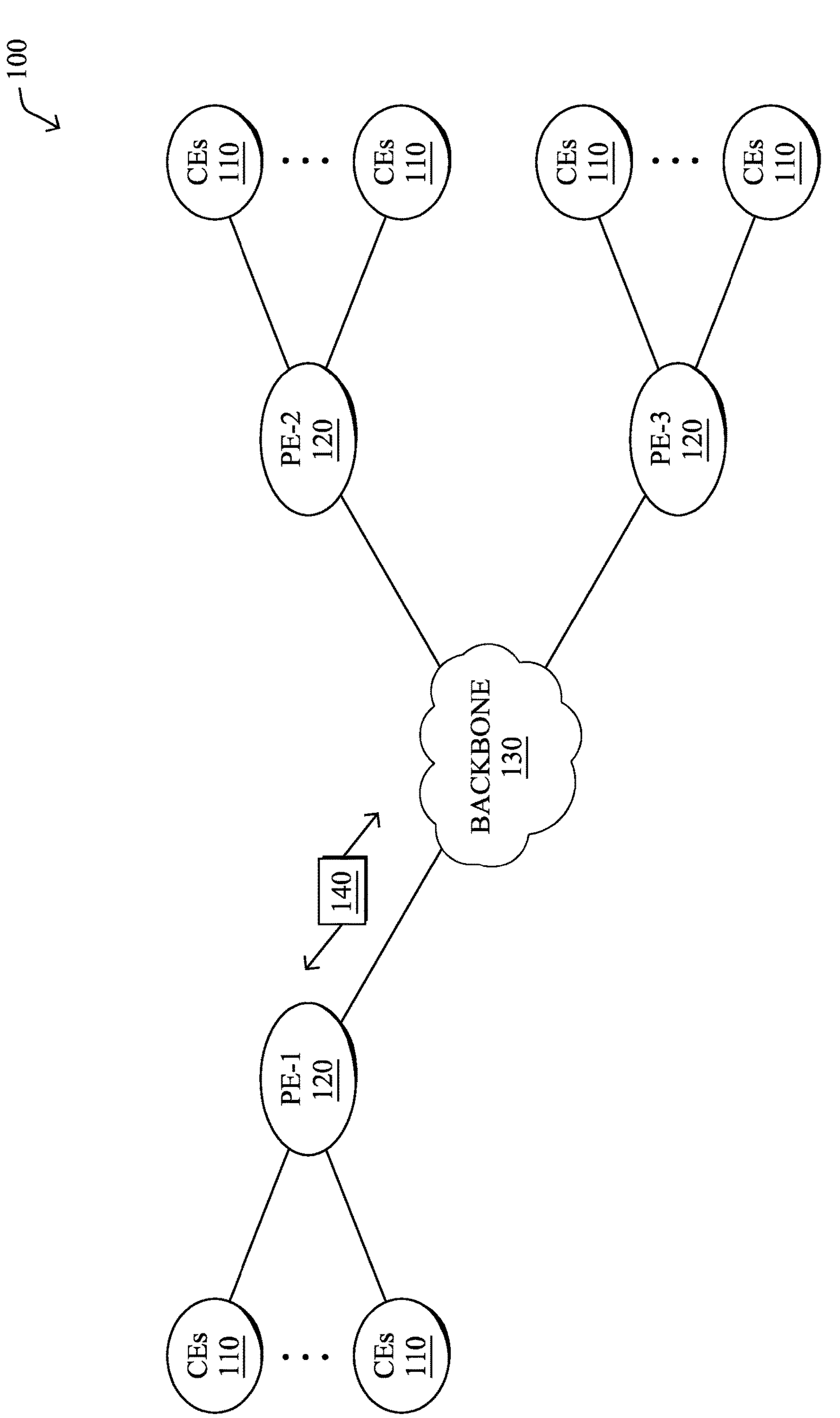
FIGS. 1A-1B illustrate an example communication network.

According to one or more embodiments of the disclosure, a device identifies a plurality of nodes of a distributed or federated learning system. The device receives model training results from the plurality of nodes. The device determines, based in part on the model training results or information about the plurality of nodes, whether a particular node or subset of nodes in the plurality of nodes provided fraudulent model training results. The device initiates a corrective measure with respect to the particular node or subset of nodes, based on a determination that the particular node or subset of nodes provided fraudulent model training results, in accordance with a policy.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
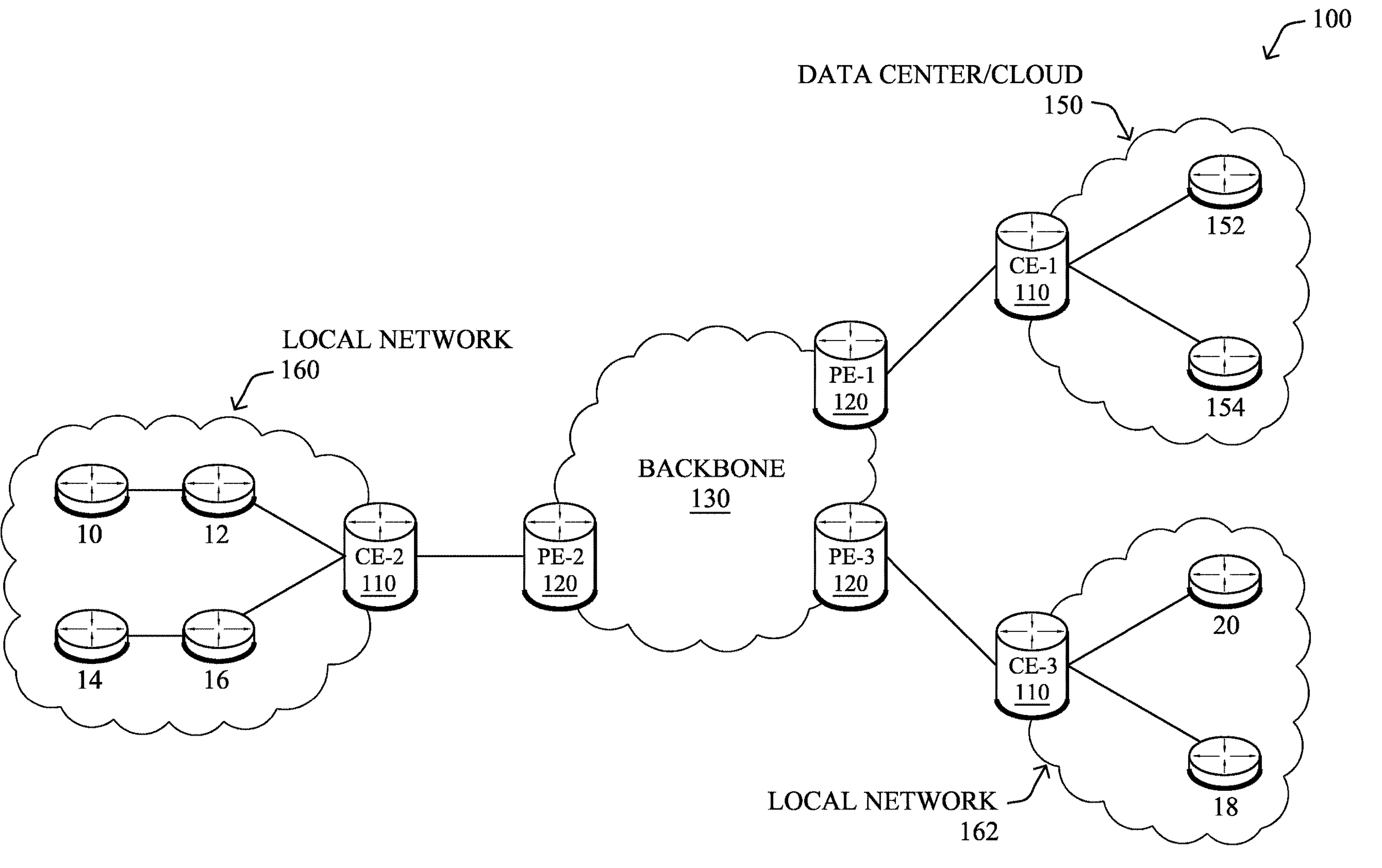

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
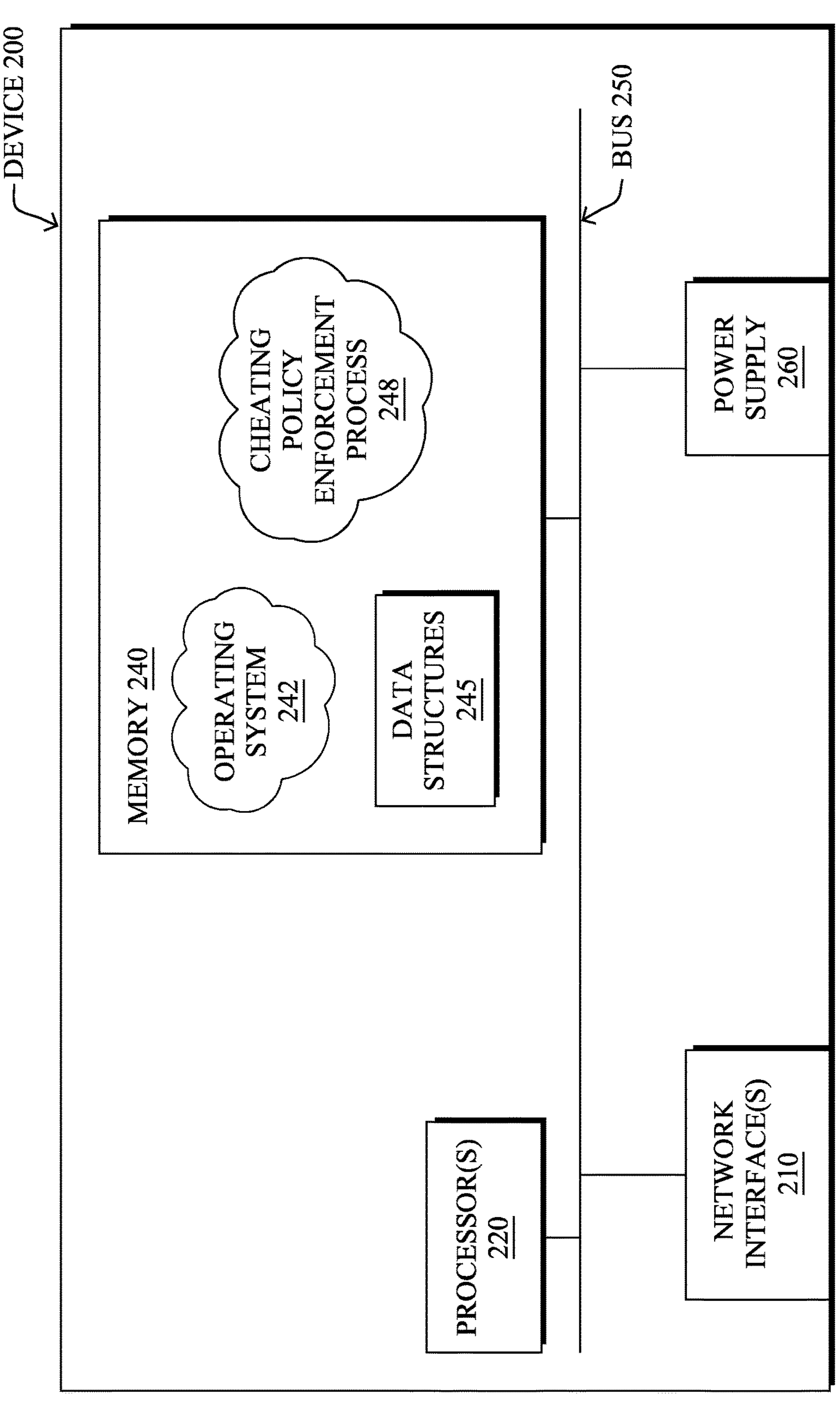
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a cheating policy enforcement process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In various embodiments, as detailed further below, cheating policy enforcement process 248 may also include computer executable instructions that, when executed by processor(s) 220, cause device 200 to perform the techniques described herein. To do so, in some embodiments, cheating policy enforcement process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, cheating policy enforcement process 248 may employ, or be responsible for the deployment of, one or more supervised, unsupervised, or semi-supervised machine learning models. Generally, supervised learning entails the use of a training set of data, as noted above, that is used to train the model to apply labels to the input data. For example, the training data may include sample image data that has been labeled as depicting a particular condition or object. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that cheating policy enforcement process 248 can employ, or be responsible for deploying, may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

Figure 3:
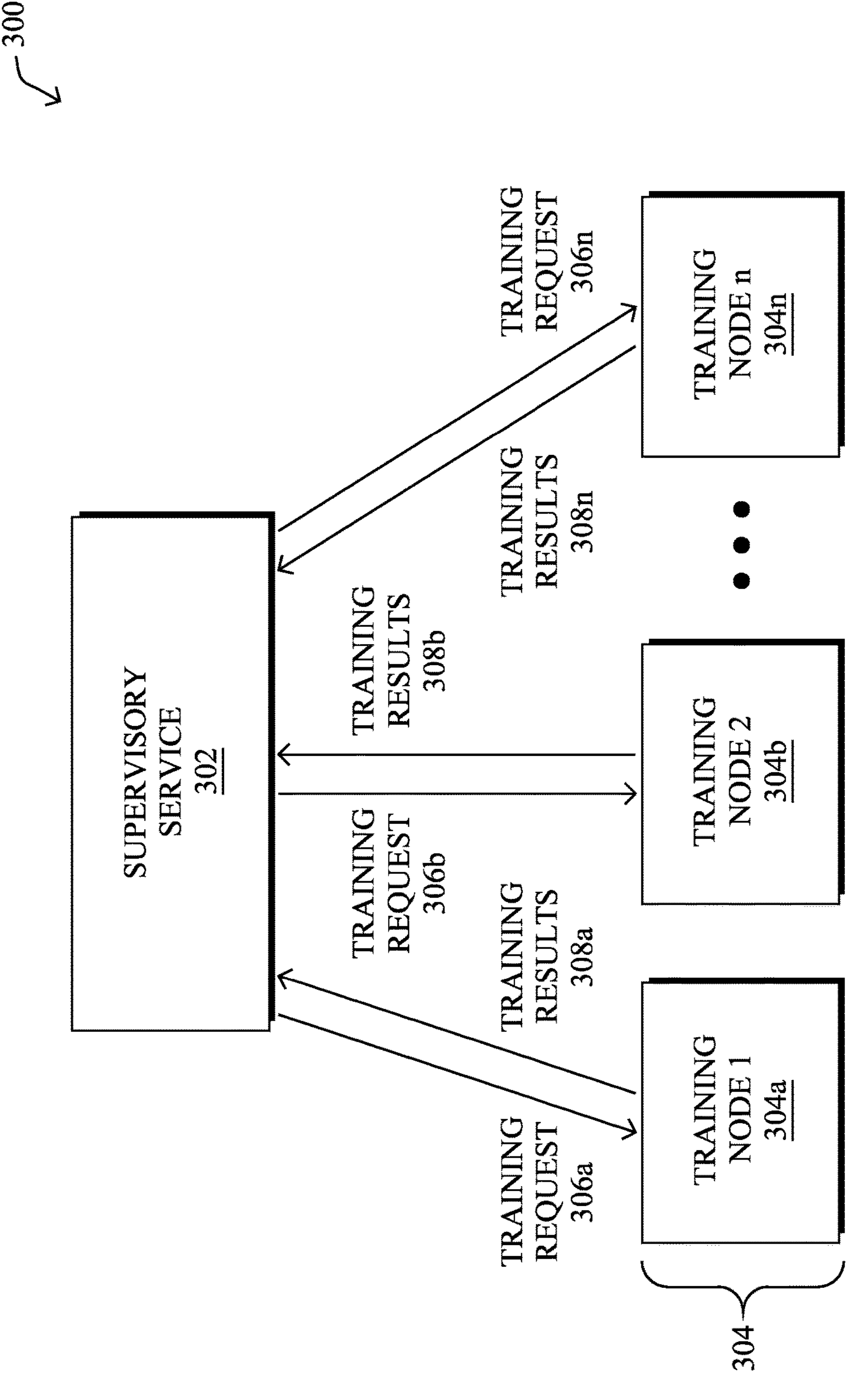
FIG. 3 illustrates an example of a federated learning system.

FIG. 3 illustrates an example of a federated learning system 300, according to various embodiments. In general, federated learning entails training a machine learning model in a distributed manner that is coordinated, centrally. For instance, as shown, assume that there is a supervisory service 302 that oversees training nodes 304 (e.g., a first through $n^{th}$ training node).

During operation, supervisory service 302 may send training requests 306 to training nodes 304, requesting each of the nodes to perform model training. For instance, supervisory service 302 may send a training request **306*a* to training node 304*a*, a training request 306*b* to training node 304*b*, etc., and a training request 306*n* to training node 304*n*. In some embodiments, each training request 306 may include data such as initial model parameters for a seed model trained by supervisory service 302, an indication as to the type training that training nodes 304 should perform, an indication as to the type of training data that each training node 304** should use for its model training, other control parameters, and the like.

In response to receiving a training request 306, a training node 304 may perform local model training. For instance, in some cases, a training node 304 may use its own local training data to train a machine learning model based on the seed model parameters in the training request 306. As would be appreciated, this type of architecture has the advantage of not requiring the local training data to be exposed, externally, thereby ensuring its privacy. For instance, assume that training nodes 304 are geographically distributed hospitals, universities, or the like, each of which maintains its own set of medical data on which it may train a machine learning model (e.g., to detect a certain type of tumor present in medical images, etc.). Such information may not be shareable for data privacy reasons, but may still be quite valuable for purposes of training a machine learning model.

Once each training node 304 has completed its model training, it may return a corresponding set of training results 308 to supervisory service 302. For instance, training node **304*a* may send training results 308*a* to supervisory service 302, training node 304*b* may send training results 308*b* to supervisory service 302, etc., and training node 304*n* may send training results 308*n* to supervisory service 302. In turn, supervisory service 302 may aggregate at least a portion of the model training results into an aggregated machine learning model. Doing so allows for the finalized model to be more robust and leverage a wider variety of training data than afforded by each training node 304, individually. In some instances, supervisory service 302 may then distribute the finalized model to any of training nodes 304** and/or to other nodes, for use.

While federated learning system 300 represents one potential framework for federated learning, other frameworks may take a more complicated approach. For instance, there may be any number of intermediate nodes between supervisory service 302 and training nodes 304 that are responsible for aggregating the models/training results for subsets of training nodes 304. In turn, the intermediate aggregation nodes may send their aggregated models to supervisory service 302, which aggregates those models into the finalized model. Other frameworks may include even more aggregation layers or take a decentralized approach. In addition, in some instances, subsets of training nodes 304 may exchange information with one another, as part of the training process.

As would be appreciated, federated learning is a specific implementation of the broader category of distributed learning, which seeks to distribute a machine learning task across multiple nodes. For instance, other distributed learning approaches may seek to train a model in parallel and potentially using homogeneous training data.

As noted above, a risk of federated and distributed learning approaches is the possibility of a training node 'cheating' with respect to its results. In some instances, this can be due to purely malicious reasons, such as the training node being infected with malware or operated by a malicious actor. In other cases, a training node may return fraudulent results by simply not carrying out its requested training, performing its model training on a partial dataset, performing model training using a different dataset than requested, or even delegating its training tasks to another node or system that returns fraudulent results.

—Uncheatable Federated Learning—

The techniques introduced herein provide mechanisms that can help to detect and protect a federated or other distributed learning system from a cheating node that supplies fraudulent results. In some aspects, the techniques herein propose a variety of tests and mechanisms to detect when a training node provides fraudulent results. In further aspects, the techniques herein also introduce policy enforcement mechanisms, to control when nodes are to be tested for fraudulent results, how the nodes are tested, any corrective measures to be taken when fraudulent results are detected, or the like.

Illustratively, the techniques described herein may be performed by hardware, software, and/or firmware, such as in accordance with cheating policy enforcement process 248, which may include computer executable instructions executed by the processor 220 (or independent processor of interfaces 210) to perform functions relating to the techniques described herein.

Specifically, according to various embodiments, a device identifies a plurality of nodes of a distributed or federated learning system. The device receives model training results from the plurality of nodes. The device determines, based in part on the model training results or information about the plurality of nodes, whether a particular node or subset of nodes in the plurality of nodes provided fraudulent model training results. The device initiates a corrective measure with respect to the particular node or subset of nodes, based on a determination that the particular node or subset of nodes provided fraudulent model training results, in accordance with a policy.

Figure 4:
FIG. 4 illustrates an example architecture for enforcing a cheating policy in a federated learning system.
Figure 4:
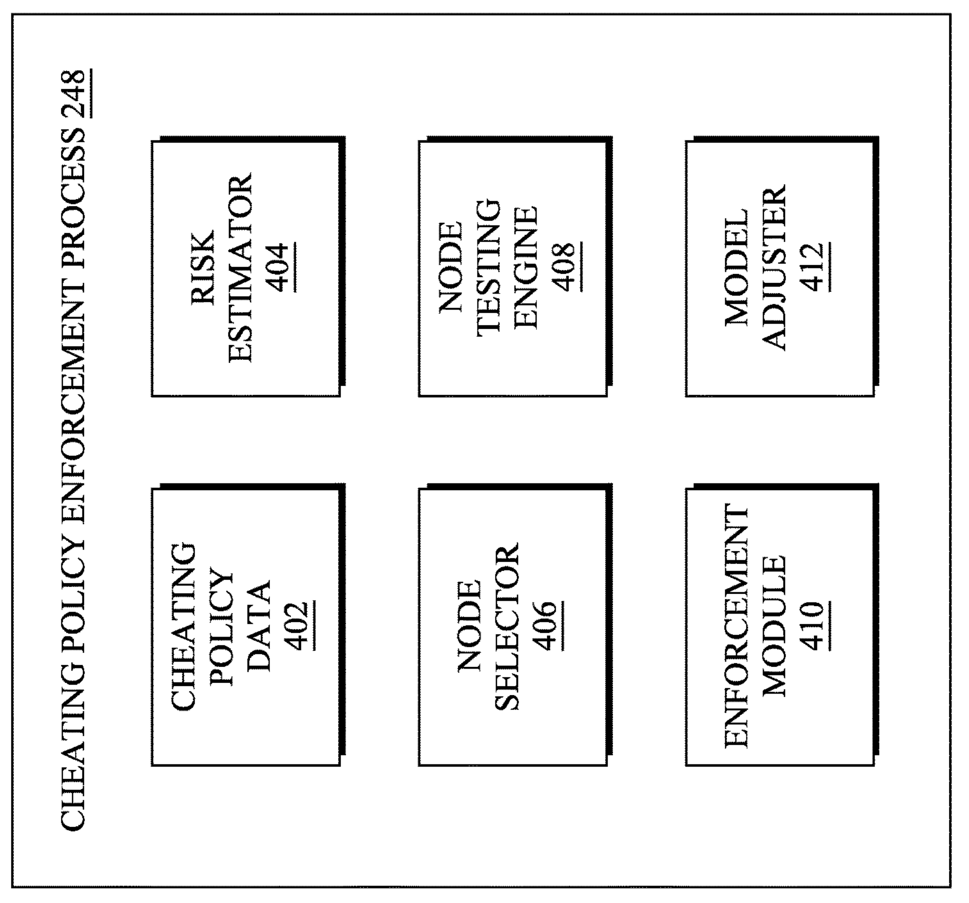

Operationally, FIG. 4 illustrates an example architecture for enforcing a cheating policy in a federated learning system, according to various embodiments. At the core of architecture 400 is cheating policy enforcement process 248, which may be executed by a supervisory device for a federated or distributed learning system, or another device in communication therewith. For instance, cheating policy enforcement process 248 may be executed by one or more devices that provide supervisory service 302 to the learning system.

As shown, cheating policy enforcement process 248 may include any or all of the following components: cheating policy data 402, a risk estimator 404, a node selector 406, a node testing engine 408, an enforcement module 410, and/or a model adjuster 412. As would be appreciated, the functionalities of these components may be combined or omitted, as desired. In addition, these components may be implemented on a singular device or in a distributed manner, in which case the combination of executing devices can be viewed as their own singular device for purposes of executing cheating policy enforcement process 248.

In general, cheating policy data 402 may include one or more policies enforced by cheating policy enforcement process 248 with respect to the nodes of a federated or distributed learning system. Such policy data 402 may be set by default, based on input from an administrator via a user interface, or combinations thereof. In various embodiments, policy data 402 may control any or all of the following:

- Which nodes of the learning system are to be tested for cheating/supplying fraudulent results.
- When the system is to test nodes of the learning for cheating.
- The type(s) of testing to use, to detect cheating.
- Which corrective measure, if any, should be initiated, when cheating is detected.

In other words, policy data 402 may include information that cheating policy enforcement process 248 uses to control the operations of its other components.

In some embodiments, cheating policy enforcement process 248 may include risk estimator 404, which is responsible for quantifying the risks associated with any given node in the learning system cheating. In one embodiment, risk estimator 404 may compute such a score based on the identity of the entity operating that node and their trust level. In additional embodiments, the risk score may be based in part on an amount of time that the node has been in operation within the learning system and/or the amount of time that the node has supplied non-fraudulent results. In other words, the risk score for a given node may decrease over time, if it is found to consistently supply non-fraudulent results. In yet another embodiment, the risk score may also factor in the potential harm that may result, were the node to supply fraudulent results. In further embodiments, risk estimator 404 may utilize machine learning or another technique to predict whether and/or when a given node or set of nodes is likely to cheat.

Cheating policy enforcement process 248 may also include node selector 406, which is responsible for selecting a given node of the learning system for testing, in some embodiments. In one embodiment, cheating policy enforcement process 248 may analyze the results of every node of the learning system and at all times, to detect fraudulent results. However, doing so can be computationally intensive and not desirable, in certain circumstances. In one embodiment, node selector 406 may base its selection in part on the risk score associated with any given node, as computed by risk estimator 404.

In various embodiments, cheating policy enforcement process 248 may also include node testing engine 408, which is responsible for testing nodes in the learning network, to detect when a node is cheating. In some embodiments, node testing engine 408 may test a node selected by node selector 406, such as based on the risk score of the node. Testing of a node by node testing engine 408 may take a variety of different forms.

In one embodiment, node testing engine 408 may perform deceptive testing of a node, to see whether it is cheating.

Such testing may entail sending incorrect model weights and/or bias to a given node, and then assessing the results that the node returns.

In another embodiment, node testing engine 408 may rely on watermarking, to detect cheating by a node. More specifically, the model provided to a node may pause training on the real data at that node. During the pause duration, the model may then train on a predefined dataset, sent as part of the model, served by a cloud service, or generated dynamically using a generative adversarial network (GAN), transformer/attention or other generation technique.

In yet another embodiment, node testing engine 408 may use multiple levels of selection, to test nodes for cheating. For instance, during pre-training, node testing engine 408 may test more nodes than would be normally used. Then, during post-training, node testing engine 408 may randomly assess the results returned from the nodes.

In yet another embodiment, node testing engine 408 may utilize anomaly detection, to detect cheating nodes. To do so, node testing engine 408 may, for instance, compare the results returned by the nodes against one another and flag any anomalous results as potentially fraudulent. Any suitable machine learning or statistics-based anomaly detection could be used for this purpose.

In another embodiment, node testing engine 408 may rely on the concept of 'buddy' nodes which refer to sets of nodes that trust one another. If such sets of buddy nodes exist, node testing engine 408 may randomly select a pair of buddy nodes and ask them to train on that same data. Node testing engine 408 may then assess their results, to identify fraudulent results.

In a further embodiment, node testing engine 408 may randomly select a node and ask that node to provide its data for training to a secure enclave, such as Intel SGX, where the enclave does not allow anyone to get access to the data or influence the training process. This allows node testing engine 408 to verify that the data is consistent with the results provided by the node.

In yet another embodiment, node testing engine 408 may rely on a proof-based mechanism, to detect cheating nodes. To do so, node testing engine 408 may require a cryptographic proof from a node that ensures that the node carried out training on a local dataset as claimed. This also does not require the dataset to be shared with cheating policy enforcement process 248, thereby ensuring the privacy of the system.

In another embodiment, node testing engine 408 may rely on game theory, to determine whether a given node is likely to be cheating. For instance, node testing engine 408 may use utility functions and models found in game theory, to determine whether a given node is cheating.

In a further embodiment, node testing engine 408 may also identify cheating based in part on the risk scores computed by risk estimator 404. For instance, if the risk of cheating exceeds a certain threshold, node testing engine 408 could determine that this is sufficient proof of cheating by a node.

In yet another embodiment, node testing engine 408 may detect cheating nodes through the use of 'honeypot' models. As would be appreciated, a cheater may be motivated to cheat when they do not want to contribute to the process, but still benefit (e.g., by receiving the globally-trained model) based on the contributions of others. In such cases, it can be assumed that the cheater knows how to undo/tune their fraudulent contribution aggregated into the global model. Since the cheater does not want to contribute and needs to pretend their contribution, the cheating node may perturb model parameters in an arbitrary fashion and returns the perturbed local model to a global model aggregator.

In order to detect (and mitigate) this kind of fraudulent behaviors, node testing engine 408 may send a model to a node that includes one or more 'honey neurons.' Such neurons may be such that they will not be updated during training and/or updated in a pre-programmed manner regardless of input. In any case, the honey neurons are not actually used during inference. Consequently, if the honey neurons are updated randomly by the cheater, node testing engine 408 can detect this in the fraudulent training results. Having too small a number of bogus neurons reduces the detection probability of cheating, whereas having too many of them increases model size (and possibly training period). In one embodiment, the number of honey neurons can also be controllable via one or more parameters.

Figure 5:
FIG. 5 illustrates an example of a training node being actively tested for fraudulent results.
Figure 5:
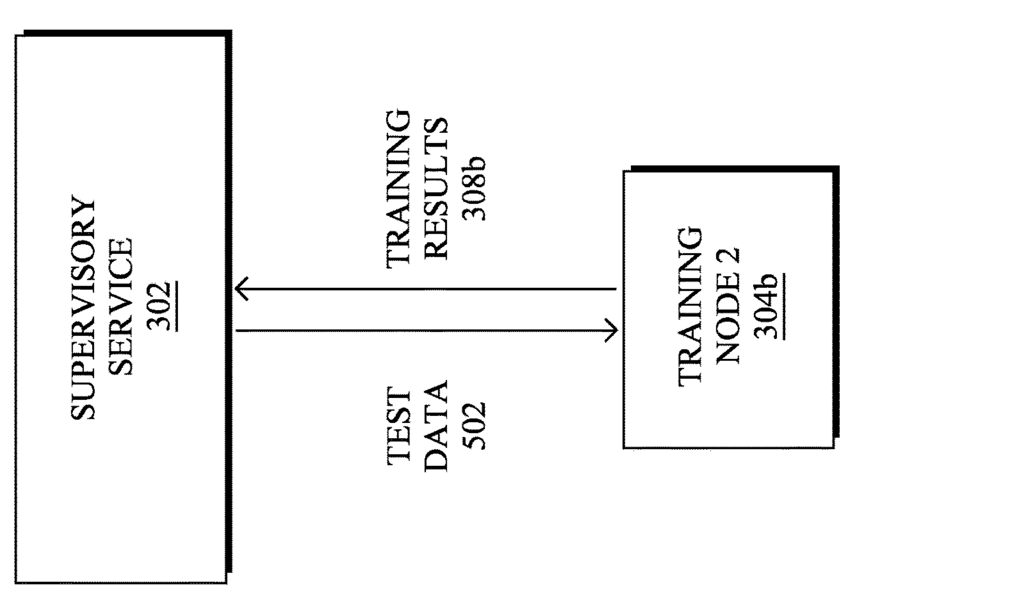

FIG. 5 illustrates an example 500 of a training node being actively tested for fraudulent results, according to various embodiments. Continuing the example of FIG. 3, assume that training node 304*b* has been selected by supervisory service 302 to be tested for cheating. In such a case, supervisory service 302 may send test data 502 to training node 304*b*, as part of a training request. For instance, test data 502 may include a honeypot machine learning model having one or more honey neurons, as described above. In other cases, test data 502 may include incorrect weights or bias.

In response to test data 502, training node 304*b* may perform its model training based on test data 502 and return training results 308*b* to supervisory service 302. In doing so, supervisory service 302 may utilize node testing engine 408, to assess the results and determine whether training results 308*b* is fraudulent. For instance, in the case of test data 502 including a honeypot model, supervisory service 302 may assess the honey neuron(s) and see whether they have been modified by training node 304*b*.

Referring again to FIG. 4, enforcement module 410 may be responsible for initiating a corrective measure with respect to any nodes identified as cheating by node testing engine 408, in some embodiments. In one embodiment, the corrective measure may entail blocking the cheating node from further participation in the learning system, placing the node on probation before fully blocking it, if it is found to be cheating again, penalizing the node in some way, giving the node more training tasks that cannot be cheated, or the like. The corrective measure may also take the form of a report or alert sent to a user interface for review by an administrator.

In some embodiments, enforcement module 410 may also initiate a corrective measure by notifying model adjuster 412 as to the cheating node. In turn, model adjuster 412 may perform a fraud-based rollback of the aggregated model, in some embodiments. More specifically, if model adjuster 412 finds that a node client $C_m$ cheated during the training cycles of $x_i, \ldots, x_k$, ($0<i\leq k\leq n$=total number of training cycles completed thus far, it may perform either of the following corrective measures:

- Roll back the model to the cycle before $x_i$, i.e., $x_{i-1}$. However, doing so may also discard the legitimate works of other training nodes.
- Roll back the updates of parameters from $C_m$ during these cycles: re-compute the parameters for all other clients and for the global model by keeping all parameters from $x_i, \ldots, x_k$, but discarding the parameters from $C_m$ during these cycles.

If there are multiple nodes that cheated during the same or other intervals, model adjuster 412 may also rollback the global model in an optimal manner so that minimum model updates are dropped. In one embodiment, model adjuster 412 may do so using a greedy algorithm or dynamic programming technique, or the like, to only perform a rollback for the training cycles during which a node cheated. In another embodiment, if the model updates from other clients did not affect the model in anyway, model adjuster 412 may discard all model updates during that period. In some instances, both approaches may be available for selection, according to one or more control parameters or by policy (e.g., as specified in policy data 402). In other instances, the second option may be used by default, as it is less computationally intensive.

Figure 6:
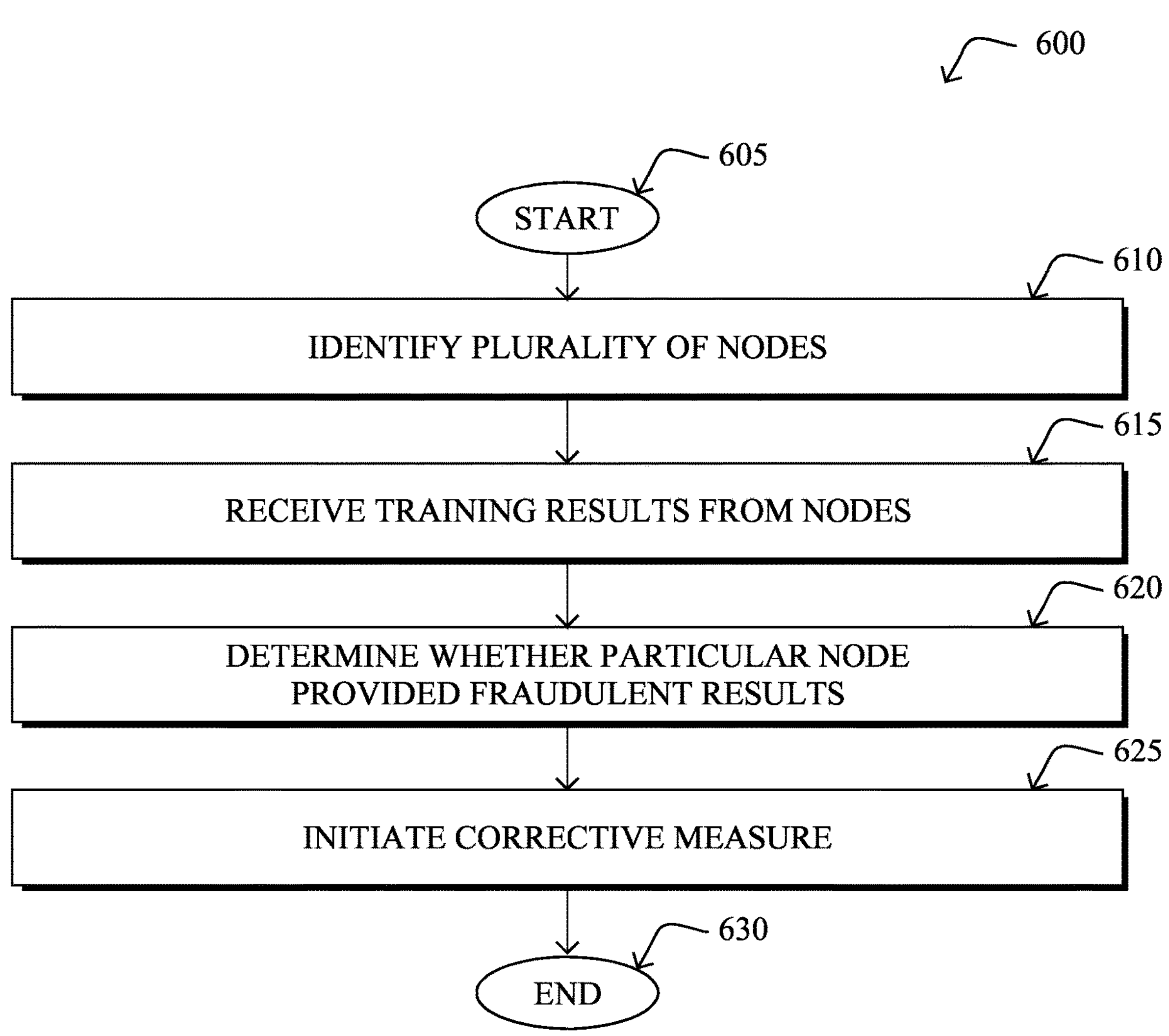
FIG. 6 illustrates an example simplified procedure for rectifying fraudulent results in a federated or distributed learning system.

FIG. 6 illustrates an example simplified procedure (e.g., a method) for rectifying fraudulent results in a federated or distributed learning system, in accordance with one or more embodiments described herein. For example, a non-generic, specifically configured device (e.g., device 200), may perform procedure 600 by executing stored instructions (e.g., cheating policy enforcement process 248). The procedure 600 may start at step 605, and continues to step 610, where, as described in greater detail above, the device may identify a plurality of nodes of a distributed or federated learning system. In some embodiments, the plurality of nodes each train a machine learning model using local training data, to generate the model training results. In further embodiments, nodes in the plurality of nodes are geographically distributed.

At step 615, as detailed above, the device may receive model training results from the plurality of nodes. In some embodiments, the device may receive the model training results in response to a model training request sent to the plurality of nodes. For instance, the model training results may include model information for machine learning models trained locally by the training nodes.

At step 620, the device may determine, based in part on the model training results, whether a particular node or subset of nodes in the plurality of nodes provided fraudulent model training results, as described in greater detail above. In one embodiment, the device may test the particular node for fraudulent model training results, based on a likelihood of it supplying fraudulent model training results. In one embodiment, the device may make its determination In one embodiment, the device may make its determination in part by sending a honeypot machine learning model to the particular node on which it is supposed to generate its model training results, whereby the honeypot machine learning model includes one or more neurons that should not be updated by the particular node during model training. In another embodiment, the device may do so in part by sending incorrect model weights to the particular node for model training, to assess how the particular node responds. In yet another embodiment, the device may do so in part by comparing the model training results of the particular node to those of one or more other nodes in the plurality of nodes. In further embodiments, the device may make this determination by identifying a subset of the plurality of nodes to which the fraudulent model training results are attributable. In yet other embodiments, the device may make the determination based on information about the plurality of nodes (e.g., to identify fake devices or devices generating fake data).

At step 625, as detailed above, the device may initiate a corrective measure with respect to the particular node or subset of nodes, based on a determination that the particular node provided fraudulent model training results, in accordance with a policy. In one embodiment, the corrective measure entails blocking the particular node from performing further model training in the distributed or federated learning system. In another embodiment, the corrective measure comprises rolling back a machine learning model trained based in part on the model training results from the particular node. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for uncheatable federated and other distributed learning, it is to be understood that various other adaptations and modifications may be made within the spirit and scope of the embodiments herein. For example, while certain embodiments are described herein with respect to machine learning workloads directed towards model training, the techniques herein are not limited as such and may be used for other types of machine learning tasks, such as making inferences or predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:

identifying, by a device, a plurality of nodes of a distributed or federated learning system;

receiving, at the device, model training results from the plurality of nodes;

computing, by the device, a risk score for each node in the plurality of nodes based at least in part on the model training results;

determining that the risk score of one or more first nodes of the plurality of nodes satisfies a threshold; and in response to determining that the risk score of one or more first nodes satisfies the threshold:

testing, by the device, the one or more first nodes;

classifying, by the device and based at least in part on the testing, the model training results from the one or more first nodes as fraudulent model training results, wherein the fraudulent model training results are indicative of the one or more first nodes not performing requested training, performing the requested training on a partial or incorrect dataset, or delegating the requested training; and initiating, by the device, a corrective measure with respect to the one or more first nodes in accordance with a policy.

2. The method as in claim 1, wherein the plurality of nodes each train a machine learning model using local training data, to generate the model training results.

3. The method as in claim 1, wherein nodes in the plurality of nodes are geographically distributed.

4. The method as in claim 1, wherein the corrective measure entails blocking the one or more first nodes from performing further model training in the distributed or federated learning system.

5. The method as in claim 1, wherein the risk score of the one or more first nodes indicates a probability of the one or more first nodes supplying fraudulent model training results.

6. The method as in claim 1, wherein the testing comprises:

sending a honeypot machine learning model to the one or more first nodes on which it is supposed to generate its model training results, wherein the honeypot machine learning model includes one or more neurons that are not updated by the one or more first nodes during model training.

7. The method as in claim 1, wherein the testing comprises:

sending incorrect model weights to the one or more first nodes for model training, to assess how the one or more first nodes responds.

8. The method as in claim 1, wherein the testing comprises:

comparing the model training results of the one or more first nodes to those of one or more second nodes in the plurality of nodes.

9. The method as in claim 1, wherein the corrective measure comprises rolling back a machine learning model trained based in part on the model training results from the one or more first nodes.

10. The method as in claim 1, further comprising:

aggregating at least a portion of the model training results into an aggregated machine learning model.

11. An apparatus, comprising:

one or more network interfaces;

a processor coupled to the one or more network interfaces; and a memory configured to store instructions that, when executed by the processor, configure the processor to:

identify a plurality of nodes of a distributed or federated learning system;

receive model training results from the plurality of nodes;

compute a risk score for each node in the plurality of nodes based at least in part on the model training results or metadata regarding each node;

determine that the risk score of one or more first nodes of the plurality of nodes satisfies a threshold; and in response to the determination that the risk score of one or more first nodes satisfies the threshold:

test the one or more first nodes;

classify, based at least in part on the test, the model training results from the one or more first nodes as fraudulent model training results, wherein the fraudulent model training results are indicative of the one or more first nodes not performing requested training, performing the requested training on a partial or incorrect dataset, or delegating the requested training; and initiate a corrective measure with respect to the one or more first nodes in accordance with a policy.

12. The apparatus as in claim 11, wherein the plurality of nodes each train a machine learning model using local training data, to generate the model training results.

13. The apparatus as in claim 11, wherein nodes in the plurality of nodes are geographically distributed.

14. The apparatus as in claim 11, wherein the corrective measure entails blocking the one or more first nodes from performing further model training in the distributed or federated learning system.

15. The apparatus as in claim 11, wherein the risk score of the one or more first nodes indicates a probability of the one or more first nodes supplying fraudulent model training results.

16. The apparatus as in claim 11, wherein the testing comprises:

sending a honeypot machine learning model to the one or more first nodes on which it is supposed to generate its model training results, wherein the honeypot machine learning model includes one or more neurons that should not be updated by the one or more first nodes during model training.

17. The apparatus as in claim 11, wherein the testing comprises:

sending incorrect model weights to the one or more first nodes for model training, to assess how the one or more first nodes responds.

18. The apparatus as in claim 11, wherein the testing comprises:

comparing the model training results of the one or more first nodes to those of one or more second nodes in the plurality of nodes.

19. The apparatus as in claim 11, wherein the corrective measure comprises rolling back a machine learning model trained based in part on the model training results from the one or more first nodes.

20. A tangible, non-transitory, computer-readable medium storing program instructions that cause a device to execute a process comprising:

identifying, by the device, a plurality of nodes of a distributed or federated learning system;

receiving, at the device, model training results from the plurality of nodes;

computing, by the device, a risk score for each node in the plurality of nodes based at least in part on the model training results or metadata regarding each node;

determining that the risk score of one or more first nodes of the plurality of nodes satisfies a threshold; and based at least in part on determining that the risk score of one or more first nodes satisfies the threshold:

testing the one or more first nodes;

classifying, based at least in part on the testing, the model training results from the one or more first nodes as fraudulent model training results, wherein the fraudulent model training results are indicative of the one or more first nodes not performing requested training, performing the requested training on a partial or incorrect dataset, or delegating the requested training; and initiating, by the device, a corrective measure with respect to the one or more first nodes in accordance with a policy.

* * * * *